(12) United States Patent
Suryanarayana et al.

(10) Patent No.: US 8,374,324 B2
(45) Date of Patent: Feb. 12, 2013

(54) METHODS OF USING BIOMETRIC DATA IN A PHONE SYSTEM AND APPARATUSES TO PERFORM THE METHODS

(75) Inventors: Lalitha Suryanarayana, Austin, TX (US); Michael F. Grannan, Austin, TX (US); Claire Svetana Vishik, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1328 days.

(21) Appl. No.: 11/143,110

(22) Filed: Jun. 2, 2005

(65) Prior Publication Data

US 2006/0285659 A1  Dec. 21, 2006

(51) Int. Cl.
*H04M 11/00* (2006.01)
(52) U.S. Cl. ............... 379/102.02; 340/5.82; 348/14.05; 370/352; 379/88.01; 379/93.03; 379/102.07; 379/167.13; 455/556.1
(58) Field of Classification Search ............ 379/52, 379/67.1–88.28, 90.01, 93.01–93.37, 101.01–102.07, 379/110.01, 201.01, 142.01–142.18, 167.01–176, 379/387.01–388.07; 370/351–356, 259–271; 455/410–411, 412.1–417, 418–420, 426.1–426.2, 455/456.1–466, 550.1–560; 709/201–207, 709/217–248; 715/716–717, 719–722, 738–739, 715/741–747; 348/14.01–14.16, 211.99–211.14, 348/552; 340/5.8–5.86, 825.19, 5.1–5.33, 340/5.8–5.85; 704/270–278
See application file for complete search history.

(56) References Cited

U.S. PATENT DOCUMENTS

| 5,222,127 | A | | 6/1993 | Fukui | |
|---|---|---|---|---|---|
| 5,465,290 | A | * | 11/1995 | Hampton et al. | .......... 379/88.02 |
| 5,513,107 | A | | 4/1996 | Gormley | |
| 5,541,988 | A | | 7/1996 | Draganoff | |
| 5,774,859 | A | * | 6/1998 | Houser et al. | .................. 704/275 |
| 5,872,834 | A | * | 2/1999 | Teitelbaum | ................ 379/93.03 |

(Continued)

FOREIGN PATENT DOCUMENTS

| DE | 3200749 A1 | 7/1983 |
|---|---|---|
| EP | 0194387 A3 | 5/1988 |

(Continued)

OTHER PUBLICATIONS

Notice of Grounds for Rejection, Patent Application No. 2006-139979, Japanese Patent Office, Dec. 11, 2007.

(Continued)

*Primary Examiner* — Hemant Patel
(74) *Attorney, Agent, or Firm* — Toler Law Group, PC (57) ABSTRACT

A phone system can include a phone terminal that includes a biometric data input device. Methods of using the phone terminal can include receiving biometric data of a user at the phone terminal and comparing the biometric data to saved biometric data. A comparison of the received and saved biometric data can be performed to locate one or more configuration files for a user, to authenticate or otherwise confirm the identity of a party, perform another activity, or any combination thereof. In one embodiment, the biometric data, other data, or a combination thereof can be used to access one or more configuration files that can be used to configure a phone terminal or a data processing system outside of the phone terminal. In another embodiment, the identity of a calling party, a called party, one or more other parties, or any combination thereof can be authenticated or otherwise confirmed.

17 Claims, 4 Drawing Sheets

U.S. PATENT DOCUMENTS

| | | | | |
|---|---|---|---|---|
| 6,075,983 | A * | 6/2000 | Kumagai | 455/410 |
| 6,104,913 | A * | 8/2000 | McAllister | 455/41.1 |
| 6,122,357 | A * | 9/2000 | Farris et al. | 379/207.02 |
| 6,195,568 | B1 * | 2/2001 | Irvin | 455/563 |
| 6,324,271 | B1 * | 11/2001 | Sawyer et al. | 379/142.05 |
| 6,421,432 | B1 * | 7/2002 | Stanford et al. | 379/110.01 |
| 6,535,582 | B1 * | 3/2003 | Harris | 379/88.01 |
| 6,650,888 | B1 * | 11/2003 | Cook | 455/410 |
| 6,757,718 | B1 * | 6/2004 | Halverson et al. | 709/218 |
| 6,973,299 | B2 * | 12/2005 | Apfel | 455/412.2 |
| 6,978,136 | B2 * | 12/2005 | Jenniges et al. | 455/435.1 |
| 7,006,605 | B1 * | 2/2006 | Morganstein et al. | 379/88.02 |
| 7,076,202 | B1 * | 7/2006 | Billmaier | 455/3.04 |
| 7,200,416 | B2 * | 4/2007 | Aisenberg | 455/550.1 |
| 7,231,229 | B1 * | 6/2007 | Hawkins et al. | 455/564 |
| 7,324,946 | B2 * | 1/2008 | Novack et al. | 704/273 |
| 7,388,950 | B2 * | 6/2008 | Elsey et al. | 379/201.02 |
| 7,400,712 | B2 * | 7/2008 | August | 379/88.01 |
| 7,421,389 | B2 * | 9/2008 | Reynolds et al. | 704/235 |
| 7,668,157 | B2 * | 2/2010 | Weintraub et al. | 370/352 |
| 2001/0024951 | A1 * | 9/2001 | Rignell et al. | 455/414 |
| 2002/0059588 | A1 * | 5/2002 | Huber et al. | 725/35 |
| 2002/0087858 | A1 * | 7/2002 | Oliver et al. | 713/156 |
| 2002/0109770 | A1 * | 8/2002 | Terada | 348/14.08 |
| 2002/0174444 | A1 * | 11/2002 | Gatto et al. | 725/133 |
| 2003/0046689 | A1 * | 3/2003 | Gaos | 725/34 |
| 2003/0093808 | A1 * | 5/2003 | Eyer et al. | 725/111 |
| 2003/0108158 | A1 * | 6/2003 | Brown et al. | 379/88.01 |
| 2003/0108161 | A1 * | 6/2003 | Brown et al. | 379/88.01 |
| 2003/0108227 | A1 * | 6/2003 | Philomin et al. | 382/124 |
| 2003/0110039 | A1 * | 6/2003 | Brown et al. | 704/273 |
| 2003/0123619 | A1 * | 7/2003 | McKinnon et al. | 379/88.02 |
| 2003/0129965 | A1 * | 7/2003 | Siegel | 455/411 |
| 2004/0022384 | A1 | 2/2004 | Flores et al. | |
| 2004/0117370 | A1 * | 6/2004 | Dutta et al. | 707/9 |
| 2004/0121813 | A1 * | 6/2004 | Colson et al. | 455/563 |
| 2004/0242283 | A1 * | 12/2004 | Flores | 455/566 |
| 2004/0247088 | A1 * | 12/2004 | Lee | 379/88.01 |
| 2004/0248594 | A1 * | 12/2004 | Wren, III | 455/465 |
| 2005/0070276 | A1 * | 3/2005 | McGarry | 455/432.2 |
| 2005/0105699 | A1 * | 5/2005 | Ueyama | 379/88.19 |
| 2005/0107114 | A1 * | 5/2005 | Ocock | 455/550.1 |
| 2005/0122209 | A1 * | 6/2005 | Black | 340/5.52 |
| 2005/0138177 | A1 * | 6/2005 | Davis | 709/227 |
| 2005/0226170 | A1 * | 10/2005 | Relan et al. | 370/254 |
| 2005/0261011 | A1 * | 11/2005 | Scott | 455/466 |
| 2006/0023695 | A1 * | 2/2006 | Yarlagadda et al. | 370/352 |
| 2006/0088145 | A1 * | 4/2006 | Reed et al. | 379/88.19 |
| 2009/0073965 | A1 * | 3/2009 | Dowling et al. | 370/352 |

FOREIGN PATENT DOCUMENTS

| | | |
|---|---|---|
| EP | 0310876 B1 | 4/1993 |
| EP | 0924123 A3 | 6/1999 |
| EP | 0643520 B1 | 3/2002 |
| EP | 0730387 B1 | 9/2004 |
| GB | 2293946 A | 4/1996 |
| GB | 230 5073 | 3/1997 |
| GB | 2315954 A | 2/1998 |
| GB | 2198011 A | 6/1998 |
| JP | 2002032686 A | 1/2002 |
| JP | 2002033796 | 1/2002 |
| WO | 9217943 A1 | 10/1992 |
| WO | 9514360 A1 | 5/1995 |
| WO | 9743151 A1 | 11/1997 |
| WO | 9816906 A1 | 4/1998 |
| WO | 9901315 A1 | 1/1999 |
| WO | 99/44380 A1 | 9/1999 |
| WO | 01/69900 A1 | 9/2001 |
| WO | 02093961 A1 | 11/2002 |
| WO | 2004/079498 A2 | 9/2004 |

OTHER PUBLICATIONS

Takayanagi Tetsuya, Facsimile System, Japanese Patent Abstract, Publication No. 2004-336358, Nov. 25, 2004.

Koizumi Shinya, Portable Telephone Sharing System, Japanese Patent Abstract, Publication No. 2004-363792, Dec. 24, 2004.

Sato Hiroshi, et al., Radio Telephone System, Japanese Patent Abstract, Publication No. 02-250532, Oct. 8, 1990.

Tamura Noriko, System and Method for Security of Portable Telephone, Japanese Patent Abstract, Publication No. 2000-307715, Nov. 2, 2000.

Asano Shinji, Caller Recognition System and Method, Japanese Patent Abstract, Publication No. 2001-274907, Oct. 5, 2001.

Kawada Makoto, Authentication System, Information Processor, Authentication Method, Authentication Program and Computer-Readable Recording Medium the Program Recorded Thereon, Japanese Patent Abstract, Publication No. 2003-067346, Mar. 7, 2003.

Aoki Yasuyoshi, Telephone Communication System, Japanes Patent Abstract, Publication No. 2002-354120, Dec. 6, 2002.

Okonogi Michiyoshi, Telephone Response Sending Device and Message Transmission Method, Japanese Patent Abstract, Publication No. 2001-313739, Nov. 9, 2001.

Takizawa Toshio, Electronic Money Transaction System, Japanese Patent Abstract, Publication No. 2001-067399, Mar. 16, 2001.

* cited by examiner

METHODS OF USING BIOMETRIC DATA IN A PHONE SYSTEM AND APPARATUSES TO PERFORM THE METHODS

BACKGROUND

1. Field of the Disclosure

The present disclosure relates to methods of using phone systems, and more particularly to methods of configuring phone terminals, methods of confirming the identity of parties to a phone call, and apparatuses used in carrying out the methods.

2. Description of the Related Art

A phone system user has an ability to configure a phone at a business or home that allows the user to be more efficient and productive when using the phone. When the user uses a shared phone (e.g., a public phone) or somebody else's phone, the user does not have access to information that he or she may otherwise need. Configuration of such other phone may be difficult for the user to efficiently and productively use. The user may have to make one or more follow up calls to complete a transaction or task that may have been otherwise unnecessary if the user was at his or her own phone.

Another problem with a phone system is the inability to confirm the identity of the party being called (herein "the called party") at a particular number, address or location. The person placing the call (hereinafter "the calling party") may need to communicate highly sensitive information. Many times, the voices of young adults sound confusingly similar to the voice of one of their parents. The calling party may inadvertently disclose some of the highly sensitive information before the calling party realizes that the person on the other end of the phone call is not the intended called party. Such inadvertent disclosures can cause problems.

BRIEF DESCRIPTION OF THE DRAWINGS

Skilled artisans will appreciate that elements in the figures are illustrated for simplicity and clarity and have not necessarily been drawn to scale.

DETAILED DESCRIPTION

A phone system can include a phone terminal that includes a biometric data input device. Methods of using the phone terminal can include receiving biometric data of a user at the phone terminal to previously saved biometric data. Other data (user identification, password, etc.) can also be received. A comparison of the received and saved biometric data can be performed to locate one or more configuration files for a user, to authenticate or otherwise confirm the identity of a party, perform another activity, or any combination thereof. In one embodiment, the biometric data, other data, or a combination thereof can be used to access one or more configuration files that can be used to configure a phone terminal or another part of the phone system. Such configuration can be useful for a shared phone terminal, such as a public telephone. In another embodiment, the identity of a calling party, a called party, one or more other parties, or any combination thereof can be authenticated or otherwise confirmed. The authentication or other confirmation can be useful to one or more parties on a phone call to ensure a greater likelihood that sensitive information is not accidentally or unintentionally transmitted to one or more persons that are not to receive the sensitive information.

In one aspect, a method of configuring a phone system including a phone terminal can include receiving first biometric data at the phone terminal from a first user at the phone terminal, using the first biometric data to locate a first configuration file associated with the first user, and configuring the phone terminal or another part of phone system consistent with the first configuration file.

In a second aspect, a data processing system is within a phone network. The data processing system can include an input port to receive first biometric data associated with a first user of a phone terminal, wherein the phone terminal does not include the data processing system. The data processing system also includes a configuration retrieval module to retrieve a first configuration file based at least in part on the first biometric data associated with the first user, and a configuration module to configure the phone terminal or another part of the phone system consistent with the first configuration file.

In a third aspect, a phone terminal can include a biometric data input device, and a configuration module to configure the phone terminal or a network coupled to the phone terminal in accordance to a first configuration file associated with a first user, wherein the first configuration file is selected based at least in part on first biometric data from the biometric data input device.

In a fourth aspect, a method of confirming that a called party receives a phone call can include receiving a call signal from a calling party to the called party, receiving first biometric data associated with the called party, comparing the first biometric data to second biometric data associated with the called party to substantially confirm an identity of the called party, and notifying the calling party that an identity of the called party has been confirmed.

In a fifth aspect, a data processing system can be used in a phone network. The data processing system can include a first input/output port to receive a call signal from a calling party to a called party, a second input/output port to receive first biometric data in response to an input from the called party, a comparison module to compare the first biometric data to second biometric data to substantially confirm an identity of the called party, and a notification module to notify the calling party that an identity of the called party has been substantially confirmed.

Before addressing details of embodiments described below, some terms are defined or clarified. As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, for clarity purposes and to give a general sense of the scope of the embodiments described herein, the use of "a" or "an" are employed to describe one or more articles to which "a" or "an" refers. Therefore, the description should be read to include at least one whenever "a" or "an" is used, and the singular also includes the plural unless it is clear that the contrary is meant otherwise.

Unless stated otherwise, any combination of parts of a system may be bi-directionally or uni-directionally coupled to each other, even though a figure may illustrate only a single-headed arrow or a double-headed arrow. Arrows within the drawing are illustrated, as a matter of convenience, to show a principal information, data, or signal flow within the system or between the system and one or more component outside the system, one or more modules outside the system, another system, or any combination thereof in accordance with an embodiment. Coupling should be construed to include a direct electrical connection in one embodiment and alternatively, may include any one or more of an intervening switch, resistor, capacitor, inductor, router, firewall, network fabric or the like between any combination of one or more component, one or more devices, or one or more modules.

Unless otherwise defined, technical and scientific terms used herein have the same meaning as commonly understood by one of ordinary skill in the art. In addition, the materials, methods, and examples are illustrative only and not intended to be limiting.

Figure 1:
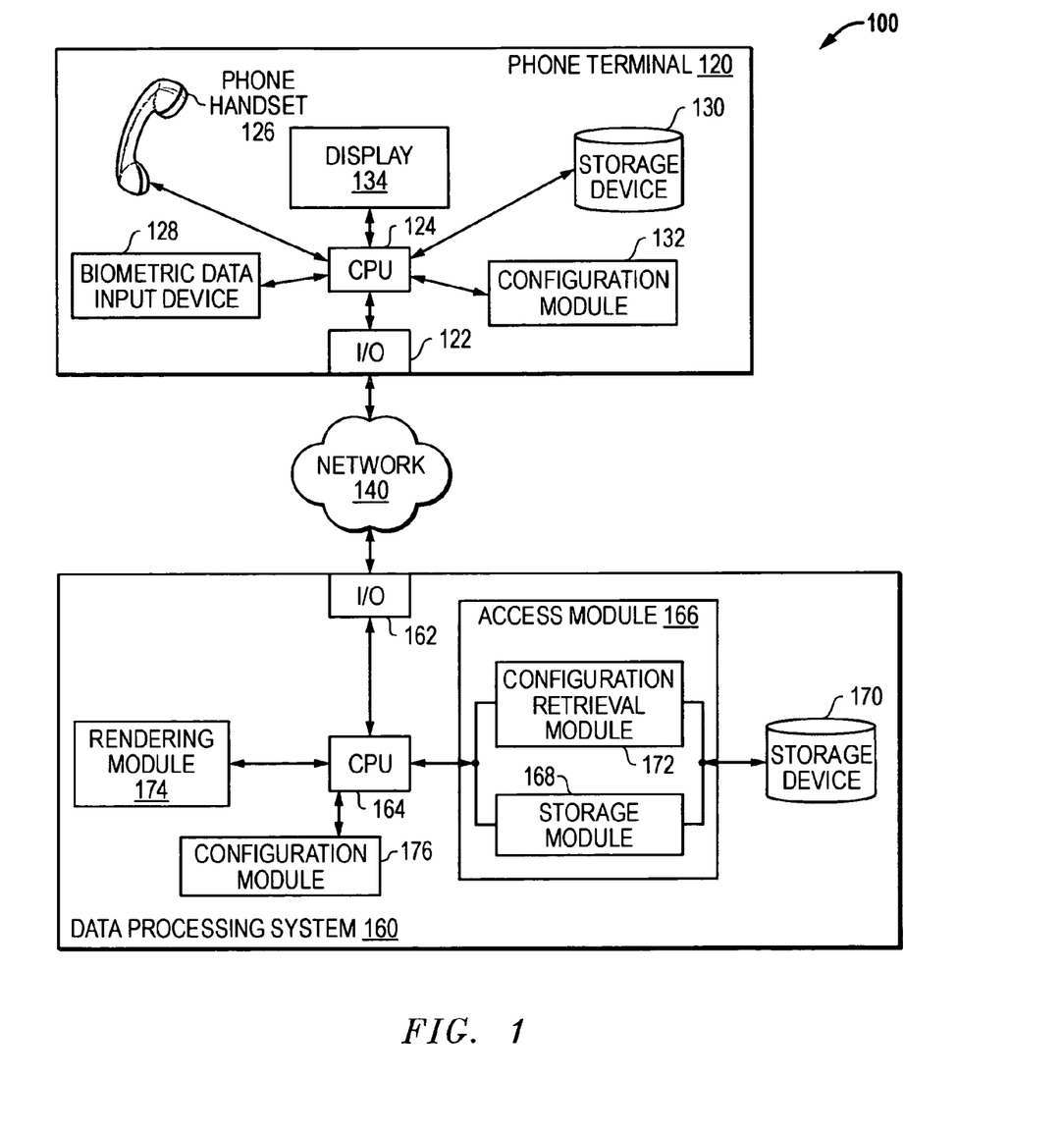
FIG. 1 includes a block diagram of a phone system that can configure a phone terminal for a particular user.

FIG. 1 includes a block diagram of a portion of phone system in accordance 100 with one embodiment. The phone system includes a phone terminal 120 that is bi-directionally coupled to a network 140 that is bi-directionally coupled to a data processing system 160. In a particular embodiment, the phone system 100 can be part of a packet-switched network that uses Internet Protocol, such as Voice over Internet Protocol ("VoIP").

The phone terminal 120 includes an input/output ("I/O") port 122 that receives a connection for the network 140. The phone terminal 120 further includes a central processing unit ("CPU") 124 that is bi-directionally coupled to the I/O port 122, a phone handset 126, a biometric data input device 128, a storage device 130, a configuration module 132, and a display 134 that is an example of an output device. After reading this specification, skilled artisans may appreciate that the phone terminal 120 may include more or fewer components than what is illustrated in FIG. 1.

The CPU 124 can be at least a part of a data processing system. Although not illustrated, other connections and memories may reside in or be coupled to the phone terminal 120. Although not illustrated, the phone terminal 120 can include additional memory, including content addressable memory, static random access memory, cache, first-in-first-out ("FIFO"), other memory, or any combination thereof. The memories, including the storage device 130, can include media that can be read by the CPU 124 within the phone terminal 120. Each type of memory includes a data processing system readable medium suitable for data processing.

The phone handset 126 and the biometric data input device 128 can be used by a calling party or a called party when using the phone terminal 120. In one embodiment, after lifting the phone handset 126 or otherwise activating the phone terminal 120 (e.g., push a button, swipe a credit card, smart card, or other card, insert money, etc.), the CPU 124 may activate the biometric data input device 128. The biometric data input device 128 can be configured to receive biometric data from a user at the phone terminal 120. An example of the biometric data can include a voice pattern, a fingerprint, an iris scan, other suitable input, or any combination thereof that uniquely corresponds to a particular individual. The design of the biometric data input device 128 can depend, in part, on the type of biometric data being collected. For example, the device may include a scanner and detector when collecting data related to a physical appearance. In another example, the device 128 can include a microphone and related logic for processing a voice pattern from the user. In another embodiment, input for a voice pattern can be received by the phone handset 126.

The storage device 130 can include information associated with one or more particular users. For each particular user, such information can include a particular user identifier, biometric data associated with that particular user, one or more configuration files for the particular user, other information associated with the particular user, or any combination thereof. The storage device 130 may include substantially the same type of information for other particular users. The storage device 130 can also include program code that includes instructions for carrying out methods as described herein.

The configuration module 132 can be used to process one or more configuration files of a particular user at the phone terminal 120. The configuration performed by the configuration module 132 is highly flexible depending on the configuration file. The configuration module may affect the phone terminal 120 or another part of the phone system 100 (e.g., another part of the data processing system 160). Details regarding possible configurations are described herein.

In one embodiment, the phone terminal 120 may be incorporated within a standalone device (e.g., a cell phone, a telephone at a kiosk, etc.) In another embodiment, the phone terminal 120 is not limited to just one hardware device and can include nearly any combination of elements (hardware, firmware, software) that acts as a phone terminal. For example, a phone terminal can be integrated into a home entertainment system, wherein signals from the network 140 may be received by a set-top box using in the home entertainment system. Audio output signals and video output signals may be routed to speakers and a television or other display of the home entertainment system. Speech of the user may be received by a microphone, and images at the user's location may be received by a camera. The microphone and camera may route the associated audio and video input signals to the set-top box. The combination of the set-top box and any one or more of the speakers, television or other display, or microphone can be the phone terminal. In one embodiment, only the audio portion or video portions may be used for a call. After reading this specification, skilled artisans will appreciate that other embodiments can be used.

The data processing system 160 includes an I/O port 162 that receives a connection to the network 140. In one embodiment, the data processing system 160 is not part of the phone terminal 120, and in a particular embodiment, the data processing system 160 lies at a location remote to the phone terminal 120 (e.g., in different rooms within a building, in different buildings, in different cities, states or provinces, countries etc.). The data processing system 160 includes a CPU 164 that is bi-directionally coupled to the I/O port 162, an access module 166, a rendering module 174, and a configuration module 176.

Although not illustrated, other connections and memories may reside in or be coupled to the data processing system 160. Although not illustrated, the data processing system 160 can include additional memory including content addressable memory, static random access memory, cache, first-in-first-out ("FIFO"), other memory, or any combination thereof. The memories, including the storage device 170, can include media that can be read by the CPU 164 within the data processing system 160. Each type of memory includes a data processing system readable medium suitable for data processing. The CPU 164 may be the same or different from the CPU 124.

The access module 166 includes a storage module 168 and a configuration retrieval module 172. The access module 166 is bi-directionally coupled to the storage device 170. The access module 166 includes logic for storing and retrieving information from the storage device 170. Such information may be substantially the same type of information as described with respect to the information within the storage device 130. In one embodiment, the functions of the configuration module 132 and storage device 130, as described with respect to the phone terminal 120, are handled by a combination of the access module 166, the storage device 170, and rendering module 174 in the data processing system 160.

When initially setting up the phone system 100 for a particular user, the particular user can submit biometric data from the phone terminal 120 or another device (e.g., a phone terminal with a headset, a computer, television remote control etc.) (not illustrated). Such information may be sent over the network 140, and received at the data processing system 160. Alternatively, biometric information can be collected by other means for some applications that require the highest level of confidentiality. Within the data processing system 160, such information is received at the I/O port 162 and forwarded to the CPU 164. The CPU 164 can send such information to be stored to the storage device 170 via the storage module 168 of the access module 166. Other data for the particular user, including a user identification, an optional password, one or more configuration files, other user information, or any combination thereof, can be stored in the storage device 170 using a similar process. In one particular embodiment, such information (or references or pointers to at least portions of such information) may reside in one or more database tables, wherein each tuple in the table(s) is associated with a particular user.

At a later time, the phone handset 126 can use the biometric data input device 128 to collect biometric data from a particular user at the phone terminal 120. Such biometric data, and potentially other information from the particular user at the phone terminal 120 can be sent to the data processing system 160 via the network 140. At the data processing system, the biometric data and potentially other information is received by the CPU 164 via the I/O port 162. The CPU can access the particular user's previously stored information in the storage device 170 via the configuration retrieval module 172 to confirm the identification of the particular user. If the identification matches, one or more configuration files from the storage device 170 can be forwarded to the configuration module 176 via the CPU 164. The configuration module 176 to configure the phone terminal 120 or another part of the phone system 100, which may or may not include another part of the data processing system 160 (i.e., outside the configuration module 176), for the particular user. The configuration may affect hardware, software, firmware, or any combination thereof.

The rendering module 174 is optional and may be used to render or otherwise process information that is to be displayed or otherwise presented to the particular user at the phone terminal 120. The rendering or other processing of data may be performed in a manner consistent with the user's configuration file.

Functions performed by anyone or more of the modules described above may be combined with one or more other modules. For example, the phone handset 126 module can perform the functions of the biometric data input device 128 if the biometric data includes a voice pattern, the functions of the configuration module 132 may be combined into the CPU 124, or the functions of the rendering module 174 may be combined into the CPU 164. In another embodiment, only one of the configuration module 132 or the rendering module 174 may be used. Additionally, anyone or more of the modules may be embodied in another portion (not illustrated) of the phone system 100 of FIG. 1. In still another embodiment, any single module may be embedded within a plurality of integrated circuits, chip sets, circuit boards, or the like. Additionally, a software program or its software components with such code may be embodied in more than one data processing system readable medium in more than one computer or other item having a CPU.

Portions of the methods described herein may be implemented in software code for carrying out the methods described. In one embodiment, the computer-executable instructions may be lines of assembly code or compiled C++, Java®, or other language code. In another embodiment, the code may be contained on a data storage device, such as a hard disk, magnetic tape, floppy diskette, optical storage device, networked storage device(s), or other appropriate data processing system readable medium or storage device.

Figure 2:
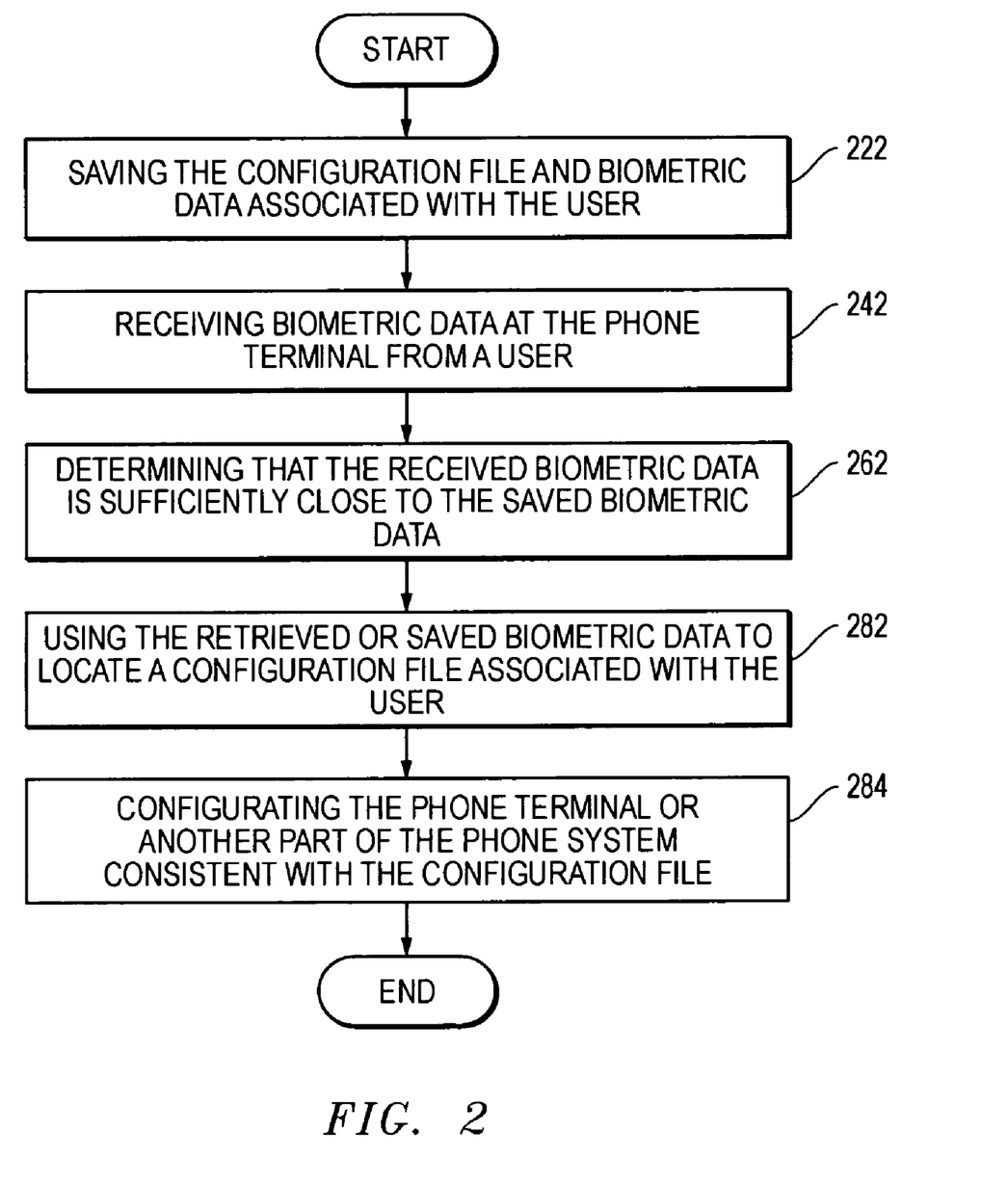
FIG. 2 includes a flow diagram of a method of configuring a phone terminal or a network coupled to the phone terminal using the phone system of FIG. 1.

FIG. 2 includes a flow diagram of an exemplary, non-limiting embodiment for using the phone system 100. The method can include saving the configuration file and biometric data associated with the user, at block 222. The configuration file and biometric data may be stored within the storage device 130, storage device 170, another storage device, or any combination thereof. Additionally, user information can be saved at this or another time. Such information can be used at a later time to confirm the identity of a particular user, locate one or more configuration files associated with that particular user, or any combination thereof.

The method can also include receiving biometric data at the phone terminal 120 from a first user, at block 242. In one embodiment, the biometric data can be received at the biometric data input device 128 of the phone terminal 120. The actual data and action required for the biometric data input will depend on the type of biometric data used by the phone system, as described herein.

The method can further include determining that the received biometric data is sufficiently close to the saved biometric data, at block 262. In one embodiment, the determination may be performed by the CPU 124 or the CPU 164. Using conventional statistical methods, processing can be performed to allow some deviation between the stored biometric data and the received biometric data. However, such statistical methods may have a sufficiently high confidence level such that each particular user at the phone terminal 120 can be uniquely identified.

The method can further include using the retrieved or saved biometric data to locate a configuration file associated with the user, at block 282. The CPU 124, storage device 130, the CPU 164, the access module 166 (and more particularly, the configuration retrieval module 172), the storage device 170, or any combination thereof may include sufficient logic for locating a user's configuration file. Such information may be stored in one or more tables within a database in storage device 130 or 170. After the configuration file is retrieved, the configuration file can be used by the CPU 124, the CPU 164, the rendering module 174, or any combination thereof in order to process information consistent with the user's configuration file. If the data processing system 160 processes the data, such data can then be forwarded to the phone terminal 120 via the network 140. In another embodiment, more than one configuration file may be used.

The method can also include configuring the phone terminal 120 or another part of the phone system 100, such as the data processing system, 160, consistent with the configuration file, at block 284. The actual configuration can be highly flexible based on the user's configuration file. In one embodiment, the configuration may affect the phone terminal 120, the data processing system 160, or a combination thereof.

In a particular embodiment, the configuration may activate a service or make the service available to the user of the phone terminal 120. For example, such services may include calling features and dialing plans ranging from ring tones, caller-identification information, call forwarding number, number of rings before call is forwarded, ability to make calls to certain numbers (e.g. international dialing, 900 numbers), speed dial lists, preference for long distance provider, quality of service, other suitable service, or any combination thereof.

In another particular embodiment, configuration can include displaying or making information available to the user at the phone terminal 120. Such display or other information can include presence information or special icons associated with specific contacts on a contact list, customized names for caller identification delivery, etc. If the user has a visual impairment, the display can be configured to meet the font size, color, contrast, etc. customized for the user. In another embodiment, the display may be configured for use a screen saver desired by the user. In addition, configuration could include access to personal phone books stored over the network, thus enabling the customer to make a call from a new location even if he or she does not remember the number.

In more particular embodiment, the rendering module 174 in the data processing system 160 renders information in a manner consistent with the configuration file and forwards the rendered information to the CPU 164. The CPU 164 sends the rendered information to the I/O port 162 that transmits the rendered information to the phone terminal 120 via the network 140. In another embodiment, the configuration module 132 can be used by the CPU 124 in configuring the display 134 in a manner consistent with the configuration module. The information that is generated by the CPU 124 or received by the CPU 124 (from the data processing system 160) is transmitted to the display 134 of the phone terminal 120.

The configuration file allows the user to significantly change the service or information (content) at or available to a phone terminal 120 to improve the customer experience when using the phone terminal 120. The services activated or made available, how such information is displayed (presentation), or a combination thereof at the phone terminal 120, can be different as compared to a prior user at the same phone terminal 120. The phone terminal 120 may be shared by many people, yet, it can be configured to act in a manner similar to a particular user's phone at the user's home or office. Effectively, the method can be used to personalize the phone terminal 120 for different users.

Note that this configuration customized for a particular user is significantly more than merely changing a name displayed of a user within a fixed template.

Figure 3:
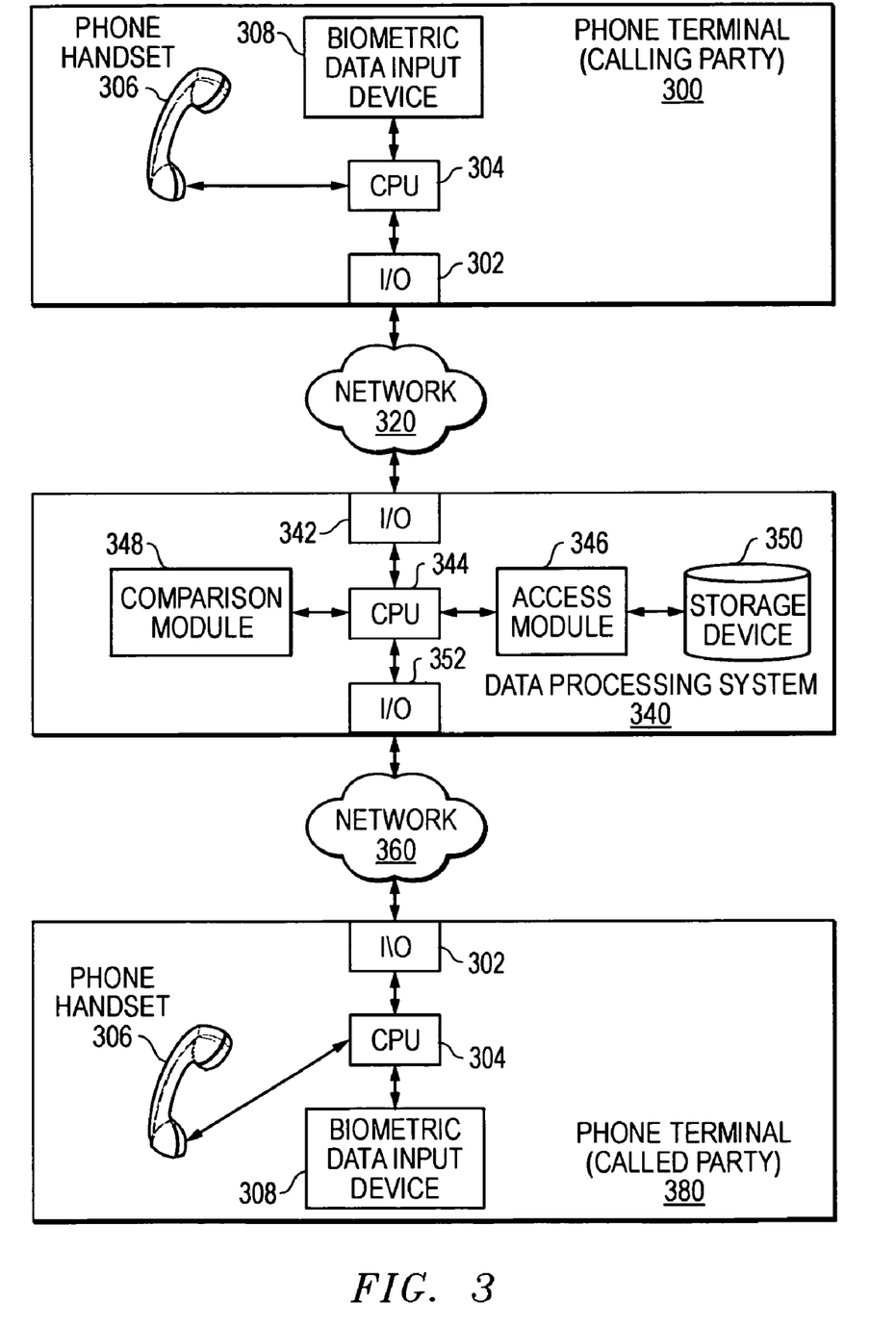
FIG. 3 includes a block diagram illustrating a phone system that can be used to confirm the identity of a calling party, a called party, or both.

The use of biometric data is not limited to phone terminal configurations. Some phone calls may require the transmission of sensitive information. In these instances, the calling party needs or desires that the identification of the called party be confirmed before the transmission of the sensitive information. FIG. 3 includes a block diagram of a phone system that can be used to confirm the identification of the calling party, the called party, or any other parties participating in a phone call. The phone system includes a phone terminal 300 that is bi-directionally coupled to a network 320 that is bi-directionally coupled to a data processing system 340. The data processing system 340 is bi-directionally coupled to a network 360 that is bi-directionally coupled to a phone terminal 380. Note that the networks 320 and 360 may be the same or different. In a particular embodiment, the phone system can be part of one or more packet-switched networks that use Voice over Internet Protocol ("VoIP").

The telephone terminals 300 and 380 may be of the same type or different types. In one embodiment, the phone terminals 300 and 380 each include substantially the same components. The phone terminals 300 and 380 each include a CPU 304 that is bi-directionally coupled to an I/O port 302, a phone handset 306, and a biometric data input device 308. The I/O port 302 of the phone terminal 300 is configured to receive a network connection from the network 320, and the I/O port 302 of phone terminal 380 is configured to receive a network connection from the network 360. Each of the I/O port 302, CPU 304, phone handset 306, and biometric data input device 308 can be any of the types as described herein with respect to the I/O port 122, CPU 124, phone handset 126, and biometric data input device 128, respectively, in FIG. 1.

The data processing system 340 includes an I/O port 342 that is configured to receive a network connection from the network 320 and another I/O port 352 configured to receive a network connection from the network 360. In another embodiment, the same I/O port may be connected to a network that is coupled to the phone terminals 300 and 380. The data processing system 340 further includes a CPU 344 that is bi-directionally coupled to the I/O port 342, the I/O port 352, an access module 346, and a comparison module 348. The access module 346 is bi-directionally coupled to a storage device 350.

The I/O ports 342 and 352 can be any of the types as described herein with respect to the I/O port 162 in FIG. 1. The CPU 344, the access module 346, and the storage device 350 can be any of the types described herein with respect to the CPU 164, access module 166, and storage device 170, respectively, in FIG. 1.

The comparison module 348 can be used in comparing biometric data previously stored within storage device 350 with biometric data received from a user at the phone terminal 300, phone terminal 380, or one or more other phone terminals coupled to the data processing system 340. The comparison module 348 may also compare a password input by a user to a password stored within the storage device 350. Additional user information that can be used for authenticating the identification of a user may be received by the data processing system 340 and compared within the comparison module 348 with information previously received that is stored in storage device 350. The comparison module 348 can produce an output that is transmitted to the CPU 344 to notify the CPU 344 whether the identification of the user at the phone terminal 300, phone terminal 380, one or more other phone terminals, or any combination thereof has been substantially confirmed. The CPU 344 has appropriate logic for disposition of a phone call based on whether the identification has been substantially confirmed or is not substantially confirmed.

Figure 4:
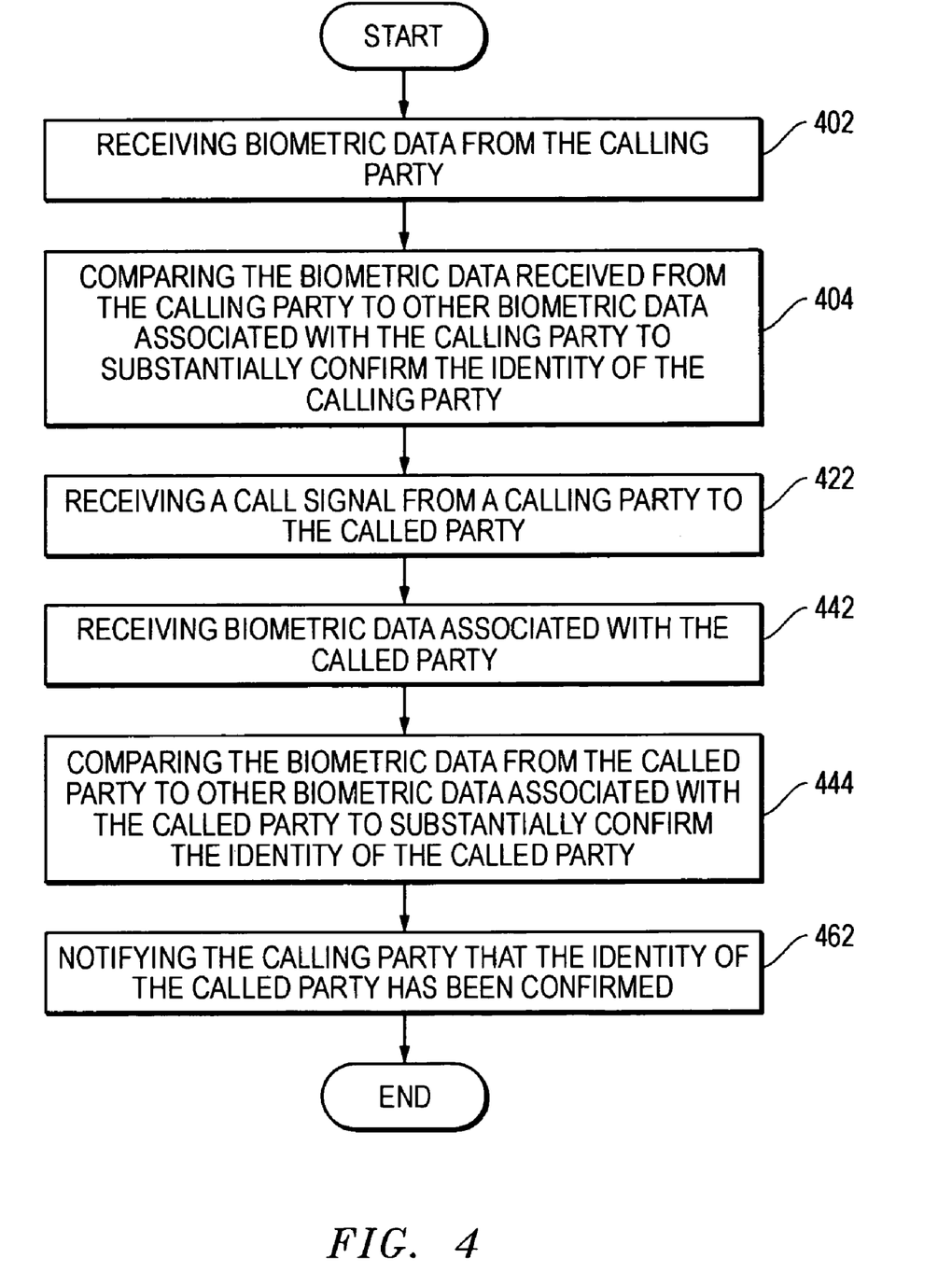
FIG. 4 includes a flow diagram of a method of confirming the identity of a calling party and a called party using the phone system of FIG. 3.

FIG. 4 includes a flow diagram for a method of using the phone system illustrated in FIG. 3. The method can include receiving biometric data from the calling party at the phone terminal 300, at block 402. In one embodiment, a user can pick up the phone handset 306 or otherwise activate the phone terminal 300 (e.g., push a button, swipe a credit card, smart card, or other card, insert money, etc.) that sends a signal to CPU 304 to activate the biometric data input device 308. The calling party can then input biometric data into the biometric data input device 308 at the phone terminal 300.

The method can also include comparing the biometric data received from the calling party (at the phone terminal 300) to other biometric data associated with the calling party to substantially confirm the identity of the calling party, at block 404. In one embodiment, data input by the user at the phone terminal 300 can be compared to data previously stored within the storage device 354 for that same user. Alternatively, a storage device (not illustrated) within phone terminal 300 may include information that can be used to confirm the identity of the calling party. The comparison may be performed within the phone terminal 300, or may occur within the data processing system 340, or within other equipment. In one embodiment where the comparison is performed by the data processing system 340, the biometric data or other user information received from the user at the phone terminal 300 can be received at the CPU 344, via the I/O port 342, and can be forwarded to the comparison module 348. Based on the user identification, the CPU 344 can retrieve user information from the storage device 350, via access module 346, to retrieve appropriate information for the user. Such information can be forwarded from the CPU 344 to the comparison module 348. The comparison module 348 can perform a comparison similar to the comparison described with respect to FIG. 1 to confirm whether the calling party has been authenticated or otherwise had his or her identity confirmed. A conventional statistical method can be used when comparing the saved and received biometric data from the user at the phone terminal 300.

The method can further include receiving a call signal from a calling party to the called party, at block 422. In one embodiment, the call signal can be transmitted from the phone terminal 300 to the data processing system 340 via the network 320. The data processing system 340 can then transmit the call signal to the phone terminal 380 via the network 360.

The method can still further include receiving biometric data associated with the called party, at block 442. In one embodiment, a user at the phone terminal 380 can pick up the handset 306 or otherwise activate the phone terminal 380. The user at the phone terminal 380 can then input his or her biometric data into the biometric input device 308 of the phone terminal 380. Such biometric data can then be sent from the phone terminal 380 to the data processing system 340 via network 360.

The method can include comparing the biometric data received from the called party to other biometric data associated with the called party to substantially confirm the identity of the called party, at block 444. In one embodiment, data input by the user at the phone terminal 300 can be compared to data previously stored within the storage device 354 for that same user. Alternatively, a storage device (not illustrated) within phone terminal 300 may include information that can be used to confirm the identity of the calling party. The comparison may be performed within the phone terminal 300, within data processing system 340, or within other equipment. In one embodiment where the comparison is performed by the data processing system 340, the biometric data or other user information received from the user at the phone terminal 380 can be received at the CPU 344, via the I/O port 352, and can be forwarded to the comparison module 348. Based on the user identification, the CPU 344 can retrieve user information from the storage device 350, via the access module 346. Such information can be forwarded from the CPU 344 to the comparison module 348. The comparison module 348 can perform a comparison similar to the comparison described with respect to FIG. 1 to confirm whether the called party has been authenticated or otherwise had his or her identity confirmed. A conventional statistical method can be used when comparing the saved and received biometric data from the user at the phone terminal 300.

If the identification of the called party has been authenticated or otherwise confirmed, the method can include notifying the calling party that the identity of the called party has been confirmed, at block 462. In one embodiment, the notification can include merely completing the connection of the telephone call by allowing the calling party at the phone terminal 300 to communicate with the called party at the phone terminal 380. In another embodiment, a recorded message can be played that would be heard by the calling party (at the phone terminal 300) that the identity of the called party (at the phone terminal 380) has been authenticated or otherwise confirmed. In still another embodiment, the called party (at the phone terminal 380) could receive notification that the identification of the calling party (at the phone terminal 300) has been authenticated or otherwise confirmed. In yet a further embodiment, after the identity of the called party (at the phone terminal 380) has been authenticated or otherwise confirmed, the called party (at the phone terminal 380) can request that the identity of the calling party (at the phone terminal 300) be authenticated or otherwise confirmed, if this has not already been done.

If the identification of the called party is not authenticated or otherwise confirmed, the calling party (at the phone terminal 300), the called party (at the phone terminal 380), or both may be notified that the identification of the called party could not be authenticated or otherwise confirmed. Such notification can occur by not completing the telephone connection, or by sending a recorded message to the calling party, the called party, or both that such identification was not authenticated or otherwise confirmed.

The phone system and methods for confirming the identification of a calling party, a called party, one or more additional parties, or any combination thereof can allow parties on a phone call to verify that the person that they are talking to is the person to which they intend to speak. In this manner, sensitive information can be transmitted with a reduced likelihood of unintentionally or accidentally transmitting such sensitive information to recipients that should not receive such sensitive information.

Note that not all of the activities described above in the general description or the examples are required, that a portion of a specific activity may not be required, and that one or more further activities may be performed in addition to those described. Still further, the order in which activities are listed are not necessarily the order in which they are performed. After reading this specification, skilled artisans will be capable of determining what activities can be used for their specific needs or desires.

Any one or more benefits, one or more other advantages, one or more solutions to one or more problems, or any combination thereof have been described above with regard to one or more particular embodiments. However, the benefit(s), advantage(s), solution(s) to problem(s), or any element(s) that may cause any benefit, advantage, or solution to occur or become more pronounced is not to be construed as a critical, required, or essential feature or element of any or all of the claims.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving first biometric data at a set top box device from a remote control device, wherein the first biometric data is received at the remote control device via a biometric input device, wherein the biometric input device is activated in response to receiving an input that indicates a phone terminal communicatively coupled to the set top box device has been activated, and wherein the first biometric data received at the set top box device from the remote control device is associated with a fingerprint, wherein the set top box device is coupled to a display device configured to display user information that is associated with one of a plurality of configuration files accessible at the set top box device;

using the first biometric data to confirm an identity of a first user and to locate a first configuration file associated with the first user, wherein the first configuration file includes a personal phone book of the first user; and in response to confirming the identity of the first user based on the first biometric data received at the set top box device, activating a service at the set top box device based on the first configuration file associated with the first user, wherein activating the service at the set top box device comprises:

displaying the personal phone book of the first user at the display device coupled to the set top box device; and displaying presence information associated with user specified contacts of the personal phone book of the first user at the display device that is coupled to the set top box device.

2. The method of claim 1, wherein confirming the identity of the first user includes determining that the first biometric data matches second biometric data within a predetermined threshold.

3. The method of claim 1, further comprising activating a second service at the set top box device, wherein the second service includes one of a calling feature, a dialing plan, caller-identification information, a call forwarding number, a number of rings before a call is forwarded, a preference for a long distance provider, a quality of service, an ability to make an international call, and an ability to make a 900 number call.

4. The method of claim 1, wherein activating the service further comprises configuring a font size of the display device based on the first configuration file.

5. An apparatus comprising:

an input port configured to receive first biometric data associated with a first user from a set top box device, wherein the first biometric data is received at the set top box device from a remote control device, wherein the first biometric data is received at the remote control device via a biometric input device, wherein the biometric input device is activated in response to receiving an input that indicates a phone terminal communicatively coupled to the set top box device has been activated, and wherein the first biometric data received at the set top box device from the remote control device is associated with a fingerprint, wherein the set top box device is coupled to a display device and configured to display user information that is associated with one of a plurality of configuration files accessible at the set top box device, and wherein the input port is adapted to communicate with the set top box device via a network;

a biometric data processing system coupled to the input port and configured to compare the first biometric data received from the set top box device to second biometric data stored at the network to confirm an identity of the first user;

a configuration retrieval module configured to:

retrieve a first configuration file associated with the first user in response to continuing the identity of the first user, wherein the first configuration file includes a personal phone book of the first user and a screen saver; and a configuration module configured to activate a service at the set top box device, wherein activating the service causes the set top box device to:

display at least a portion of the personal phone book of the first user at the display device based on the first configuration file; and display presence information associated with user specified selected contacts of the personal phone book of the first user at the display device.

6. The apparatus of claim 5, further comprising a storage module to:

store at least one configuration file, including the first configuration file; and store biometric data, including the second biometric data.

7. The apparatus of claim 5, wherein the configuration module is further configured to activate a second service at the set top box device, wherein the second service includes one of a calling feature, a dialing plan, caller-identification information, a call forwarding number, a number of rings before a call is forwarded, a preference for a long distance provider, a quality of service, an ability to make an international call, and an ability to make a 900 number call.

8. The apparatus of claim 5, further comprising enabling a connection from the set top box device to a phone terminal in response to confirming the identity of the first user at the set top box device.

9. The apparatus of claim 5, wherein the first biometric data includes an image of a physical feature associated with the first user.

10. A set top box device, comprising:

a biometric data input device, wherein the biometric data input device is activated in response to receiving an input that indicates a phone terminal communicatively coupled to the set top box device has been activated, and wherein biometric data received at the set top box device via the biometric data input device is associated with a fingerprint;

an output port coupled to a display device, the display device configured to display user information that is associated with one of a plurality of configuration files accessible at the set top box device;

a configuration module configured to activate a service at the set top box device based on a first configuration file of the plurality of configuration files that is associated with a first user, wherein the first configuration file is selected based at least in part on first biometric data received at the biometric data input device, wherein the first configuration file includes a personal phone book of the first user, and wherein activating the service at the set top box device comprises:

configuring a customized name for caller identification delivery based on the first configuration file; and displaying presence information associated with user specific selected contacts of the personal phone book of the first user at the display device;

a processing unit configured to send data related to the first biometric data to a data processing system via a network to confirm an identity of the first user, wherein the service is activated at the set top box device in response to receiving confirmation of the identity of the first user from the data processing system via the network; and an input port to receive data from a remote control device.

11. The set top box device of claim 10, wherein a connection from the set top box device to a phone terminal associated with a second user is enabled in response to receiving confirmation of the identity of the first user from the data processing system via the network.

12. The set top box device of claim 10, wherein the configuration module is further configured to activate a second service at the set top box device, wherein the second service includes one of a calling feature, a dialing plan, a call forwarding number, a number of rings before call is forwarded, a preference for a long distance provider, a quality of service, an ability to make an international call, and an ability to make a 900 number call.

13. The set top box device of claim 10, further comprising a storage device, wherein the storage device comprises:
    configuration files, including the first configuration file; and
    second biometric data of users, including the first user.

14. The method of claim 1, further comprising:
    receiving second biometric data from a second user at the set top box device;
    using the second biometric data to confirm an identity of the second user and to locate a second configuration file associated with the second user, wherein the second configuration file includes a personal phone book of the second user; and
    in response to confirming the identity of the second user based on the second biometric data received at the set top box device, making the personal phone book of the first user unavailable at the set top box device and activating a second service at the set top box device based on the second configuration file associated with the second user, wherein the second service includes making the personal phone book of the second user available at the set top box device.

15. The set top box device of claim 10, wherein the configuration module is further configured to make the personal phone book of the first user unavailable at the set top box device in response to receiving second biometric data that is associated with a second user at the biometric data input device.

16. The method of claim 1, further comprising enabling a connection from the set top box device to a phone terminal associated with a second user in response to confirming the identity of the first user and providing, via the connection, a notification that indicates the identity of the first user has been confirmed.

17. The set top box device of claim 10, wherein a camera is configured to capture images of a location of the first user of the set top box device, and wherein the images of the location of the first user are transmitted via the network to a second user.

* * * * *

UNITED STATES PATENT AND TRADEMARK OFFICE
CERTIFICATE OF CORRECTION

PATENT NO. : 8,374,324 B2  
APPLICATION NO. : 11/143110  
DATED : February 12, 2013  
INVENTOR(S) : Lalitha Suryanarayana et al.

Page 1 of 1

It is certified that error appears in the above-identified patent and that said Letters Patent is hereby corrected as shown below:

In the Claims section, Column 11, Line 67, "user in response to continuing the identity of the first" should read --user in response to confirming the identity of the first--.

In the Claims section, Column 12, Lines 10-11, "display presence information associated with user specified selected contacts of the personal phone book of" should read --display presence information associated with user specified contacts of the personal phone book of--.

In the Claims section, Column 12, Lines 56-57, "displaying presence information associated with user specific selected contacts of the personal phone book" should read --displaying presence information associated with user specified contacts of the personal phone book--.

Signed and Sealed this  
Eighteenth Day of June, 2013

Teresa Stanek Rea  
*Acting Director of the United States Patent and Trademark Office*